Oct. 17, 1967 K. E. GRINWALD 3,347,029
AQUATIC HARVESTER
Filed Aug. 20, 1964 7 Sheets-Sheet 4
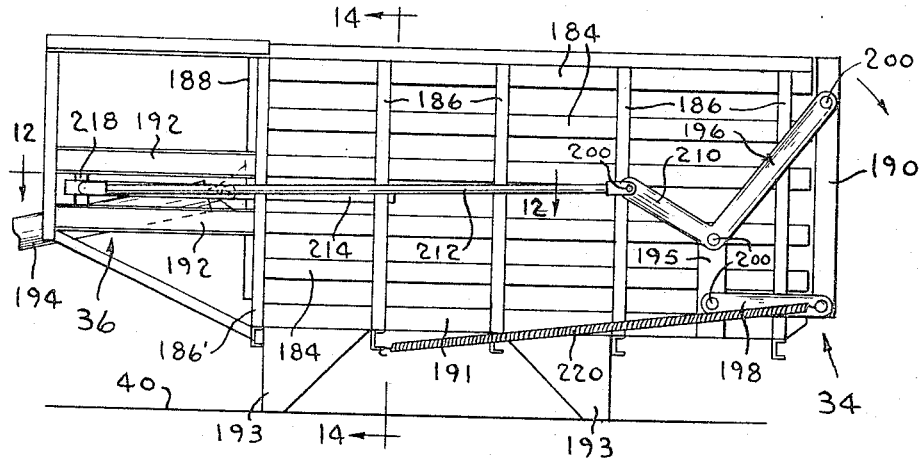
FIG. 10
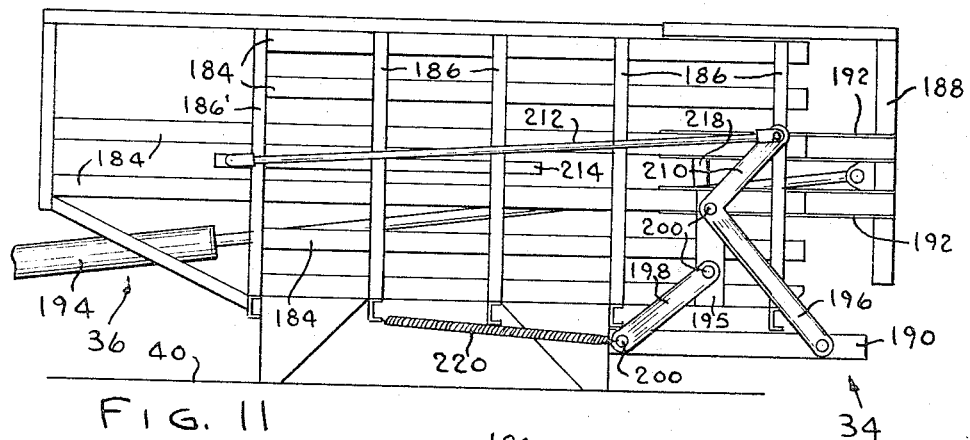
FIG. 11
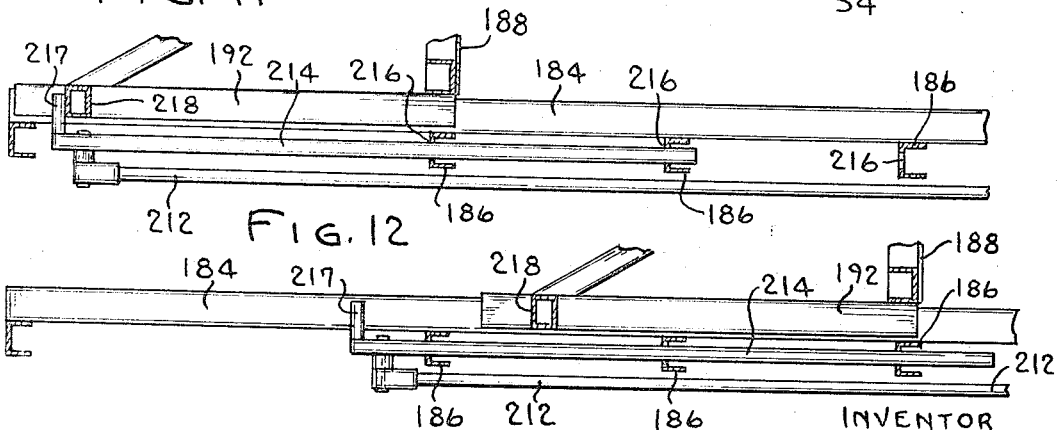
FIG. 12
FIG. 13
INVENTOR
KENNETH E. GRINWALD
BY John W. Michael
ATTORNEY

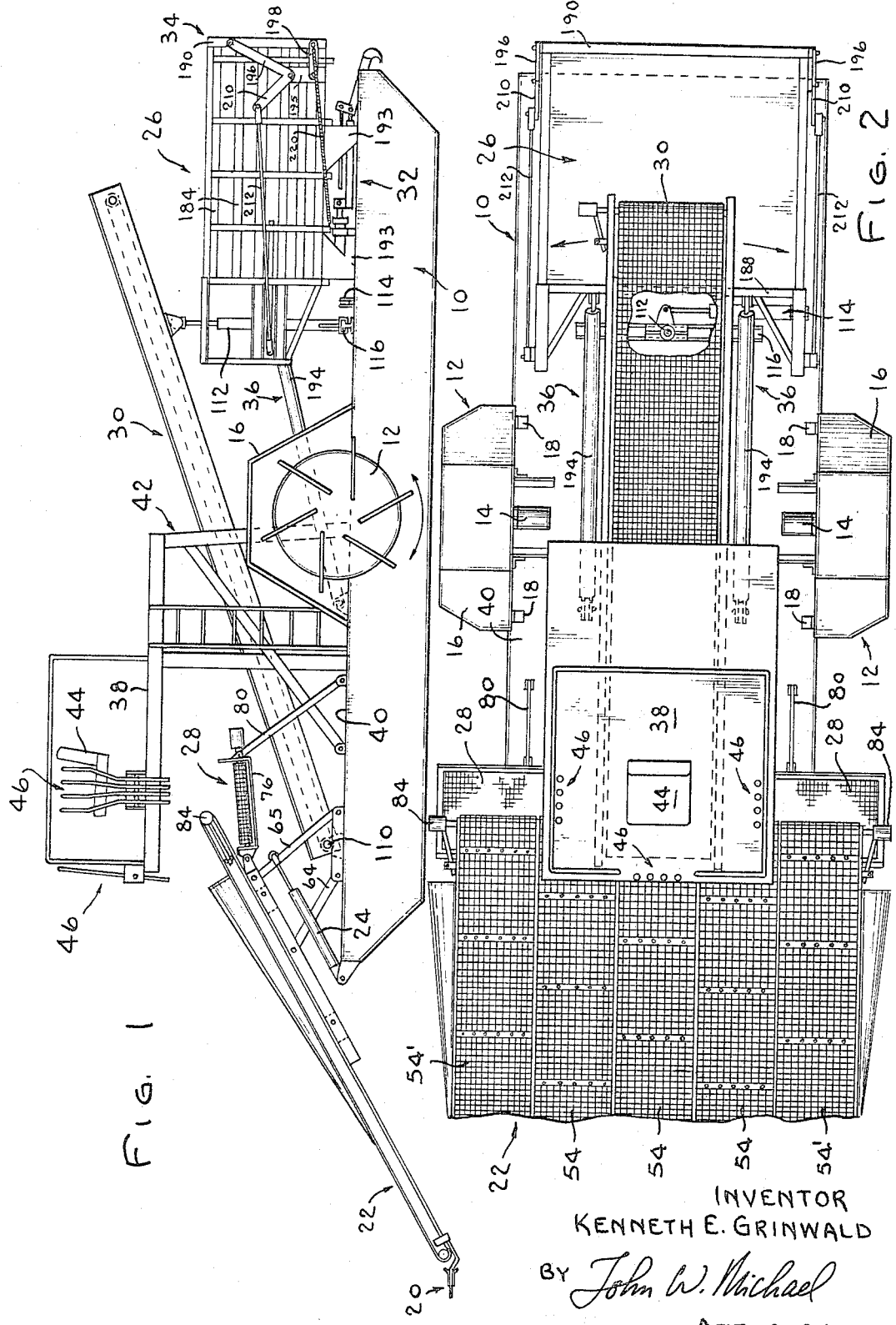

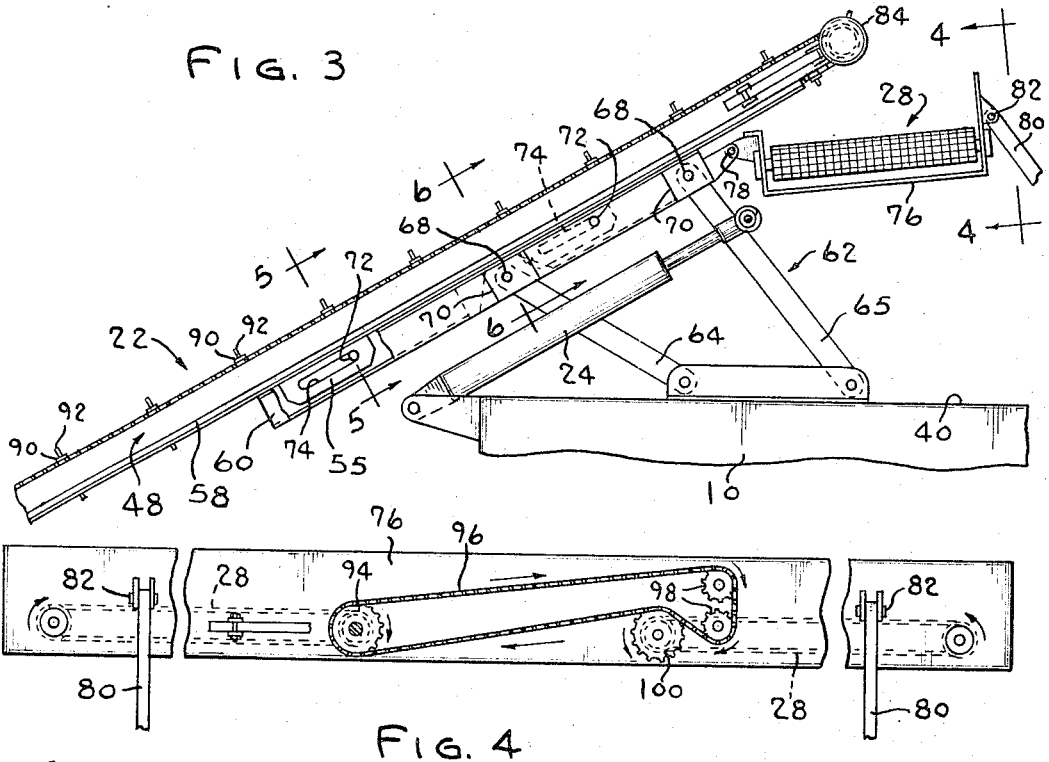

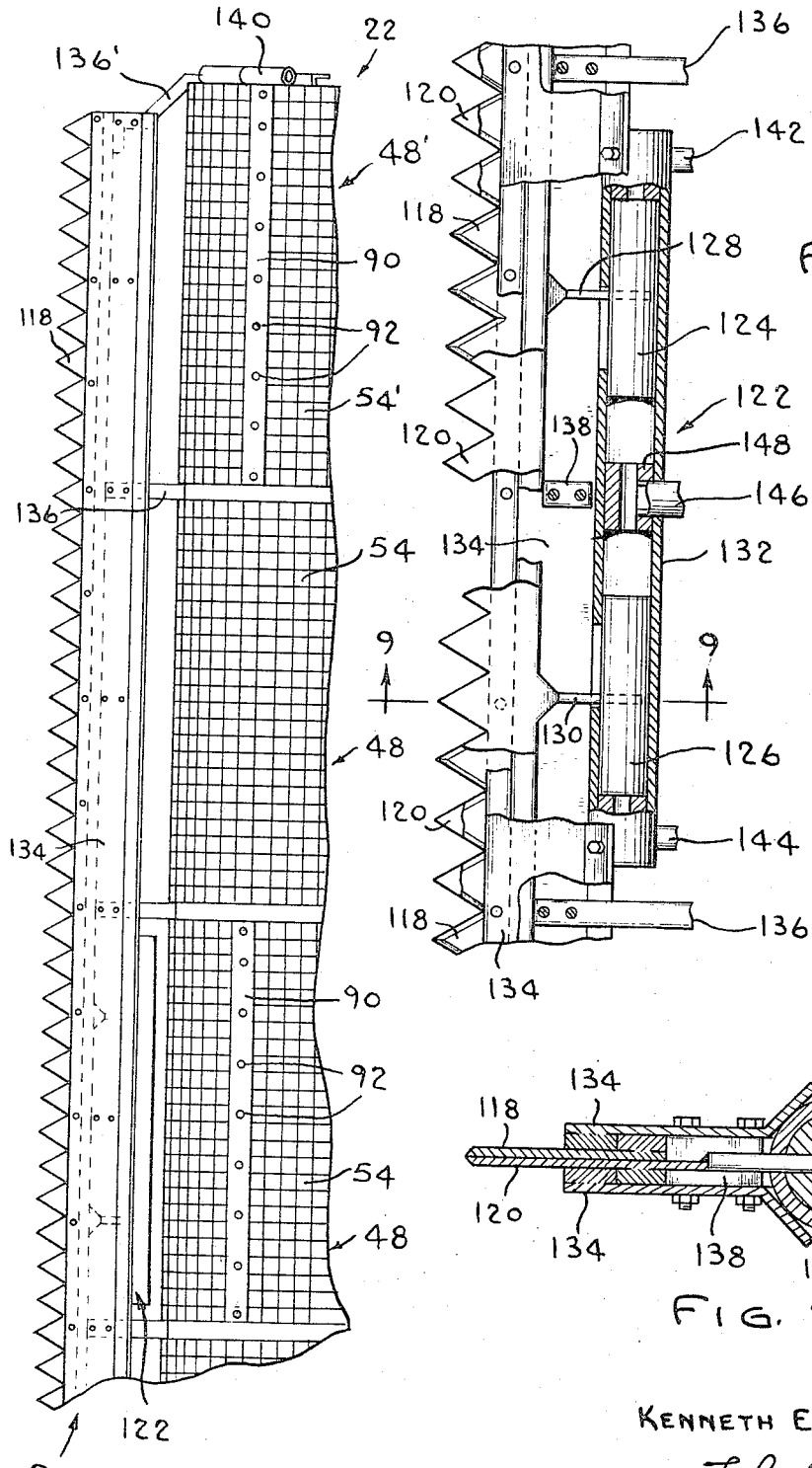

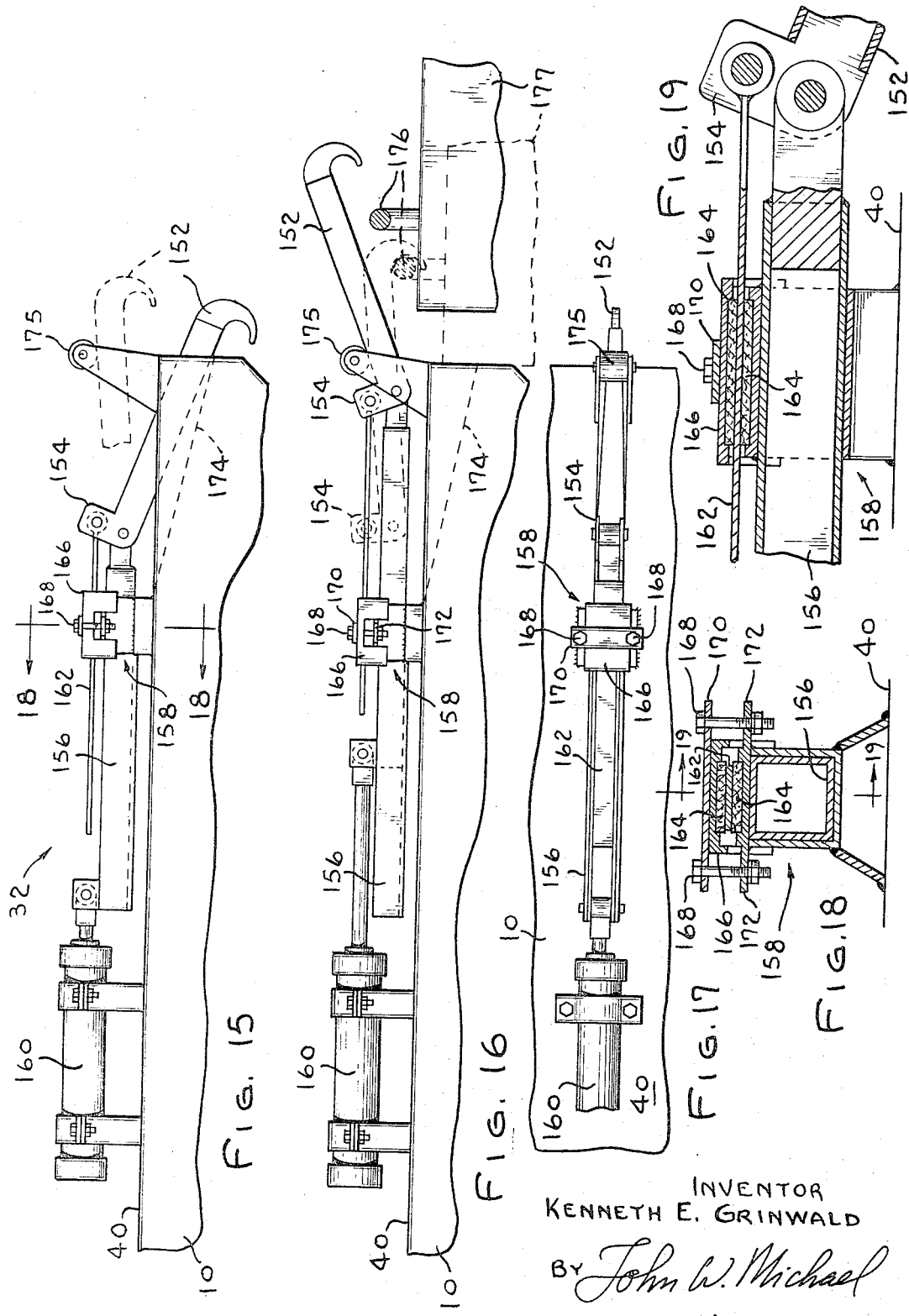

United States Patent Office 3,347,029
Patented Oct. 17, 1967

3,347,029
AQUATIC HARVESTER
Kenneth E. Grinwald, 423 Rte. 3,
Mukwanago, Wis. 53149
Filed Aug. 20, 1964, Ser. No. 390,801
15 Claims. (Cl. 56—9)

This invention pertains to improvements in aquatic harvesters which are used in removing plant growth and/or sediments from a body of water.

Basically the harvester embodying the present invention is comprised of a powered barge which is provided at its front end with a conveyor and a cutter bar assembly associated therewith which are adapted to be positioned at or near the bottom of the body of water and which are operable to remove the underwater growth and/or sediments therefrom and to convey the same to a bin on the barge by means of a set of conveyors. The machine is also provided with a mechanism for hooking and positioning a second barge in such a relationship to the storage bin that the material in the bin can be ejected into the second barge in such a manner as to avoid spillage and as to utilize the maximum capacity of the second barge. As will be more apparent from the detailed description found in the specification, the hooking and the unloading mechanisms permit very exact positioning of the dumped load into the second barge.

The harvester embodying the present invention is also provided with a hydraulic motor which actuates a set of cutter bars in such a manner as to practically eliminate any vibrations which are usually associated with this type of equipment. Further, the motor is adapted to reverse the travel of the cutter bars when they encounter a hard obstruction and thereby avoid damage to the bars.

In view of the above, the principal object of this invention is to provide an aquatic harvester having improved means for removing material from the water and having improved means for unloading the material from the barge.

Other objects and advantages will be pointed out in or be apparent from the specification and claims, as will obvious modifications of the embodiments shown in the drawings, in which:

FIG. 1 is a side elevational view of an aquatic harvester embodying the present invention;

FIG. 2 is a top plan view thereof with parts being broken away for the sake of clarity;

FIG. 3 is an enlarged side view of the main and transverse conveyors with parts broken away to show the manner in which the main conveyor is mounted on its supporting frame;

FIG. 4 is a view taken on line 4—4 of FIG. 3 showing the drive for the two transverse conveyors;

FIG. 5 is a cross-sectional view taken on line 5—5 of FIG. 3;

FIG. 6 is a cross-sectional view taken on line 6—6 of FIG. 3;

FIG. 7 is a fragmentary top plan view of the cutter bar assembly;

FIG. 8 is an enlarged top view of the cutter bars and a cross-sectional view of the hydraulic motor associated therewith, with parts being broken away for the sake of clarity;

FIG. 9 is a cross-sectional view taken on line 9—9 of FIG. 8;

FIG. 10 is a detail view of the storage bin and its associated tail gate and unloading mechanisms, with the tail gate being shown in a closed position;

FIG. 11 is a view similar to FIG. 10 showing the tail gate in the open position and the unloading mechanism in the position at the end of the unloading stroke;

FIG. 12 is an enlarged view taken on line 12—12 of FIG. 10;

FIG. 13 is an enlarged view similar to that of FIG. 12 showing the parts in a position when the tail gate and unloading mechanism are in the position shown in FIG. 11;

FIG. 14 is a fragmentary cross-sectional view taken on line 14—14 of FIG. 10;

FIG. 15 is an enlarged detail view of the hooking mechanism;

FIG. 16 is a view similar to FIG. 15 showing the hook in the extended position and showing a fragment of a transport barge;

FIG. 17 is a top plan view of the hooking mechanism when the same is in the position as shown in FIG. 15;

FIG. 18 is a cross-sectional view taken on line 18—18 of FIG. 15;

FIG. 19 is a fractional cross-sectional view taken on line 19—19 of FIG. 18;

Figure 20:
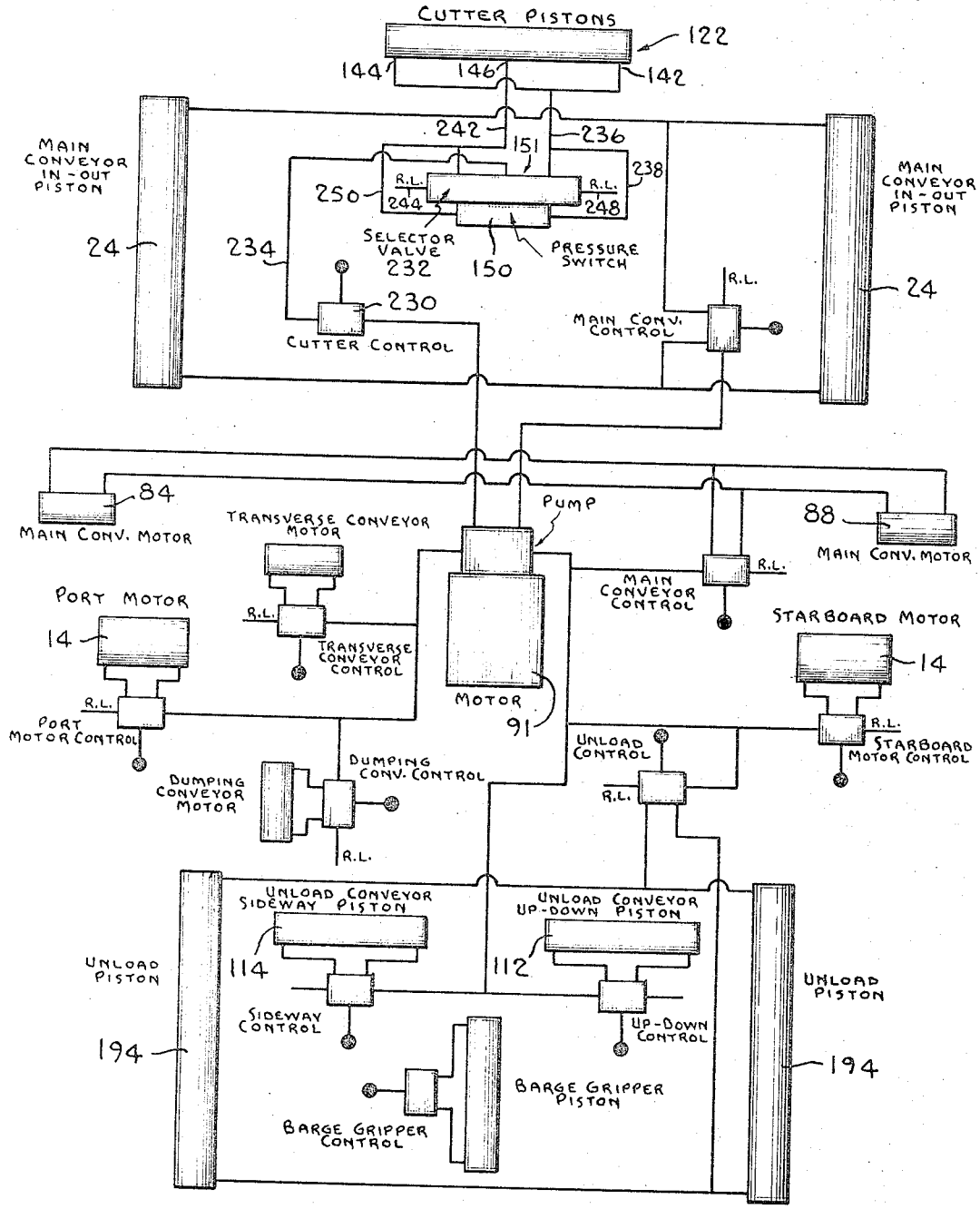
FIG. 20 is a schematic view of the hydraulic circuit of the aquatic harvester embodying the present invention.

The overall structure of the aquatic harvester is best illustrated in FIGS. 1 and 2. Essentially the harvester is comprised of a barge 10 which is adapted to be propelled by two paddle wheels 12 driven by individual hydraulic motors 14. Suitable guards 16 are provided for each wheel and are mounted on the barge at 18. The paddle wheels as well as guards are adapted to be removed from the barge to thereby narrow its width and thus facilitate easier transportation of the barge over highways. A hydraulically actuated cutter bar assembly 20 is mounted on the lower end of the main conveyor 22 which is adapted to be selectively positioned at a desired depth in the water by hydraulic cylinders 24. The underwater vegetation cut by the cutter bar assembly is removed from the water by the main conveyor and is moved to a storage bin 26 at the rear of the barge by two transverse conveyors 28 and a loading conveyor 30.

The rear of the barge is provided with a hooking assembly 32 by means of which a transport barge can be accurately hooked and positioned to permit the material to be ejected therein. The storage bin is provided with a tail gate assembly 34 and an ejection mechanism 36 which cooperate to deposit the material in a predetermined location on the transport barge.

An operator's platform 38 is positioned above the deck 40 and at the forward end of the barge by suitable support structure 42. An operator's seat 44 and hydraulic controls 46 are mounted thereon. This position has the distinct advantage over a position at deck level in that the elevated position gives the operator a clear view of lake or stream bottom and thus permits him to better position and control the cutter bar assembly.

The component parts of the aquatic harvester are shown in more detail in FIGS. 3–22 and for the sake of simplicity will be discussed under separate subheadings.

*Conveyor system*

The main conveyor 22 is best illustrated in FIGS. 3–6. The conveyor has a frame 48 which is constructed of several longitudinally extending box sections 50 and channel members 52 which are tied together by suitable cross members (not shown) to form a rigid grid-like support structure for several wire mesh endless conveyor bands 54. It is preferable that the two outer conveyor bands 54' be supported by subframes 48' (of the same type of construction as frame 48) which are removably secured to frame 48 by several bolts 56 (one only being shown in FIGS. 5 and 6) to thereby permit the removal of the subframes before the barge is to be transported over land. Curved guards 49 are provided on the outer sides of frames 48' which tend to prevent slippage of the material over the sides of the conveyor.

Longitudinally extending flanged members 58 are fixed to the undersides of box sections 50 and retain the conveyor bands against the frames. The flanges of two pairs of members 58 are in sliding contact with the flanges of two channel members 60 of the support frame 62. At this point it should be noted that the support frame is symmetrical and for this reason only one side of the same needs detail description. The channel members are of a cross-section as shown in FIG. 5 throughout most of their length and are provided with cut out portions in their web in locations at which they are fixed to support arms 64 and 65 by pins 68. In these places the channel members are reinforced by plates 70.

The relative sliding motion between the conveyor frame 48 and the support frame 62 is limited by pins 72 fixed in the support frame and received in slots 74 provided in downwardly extending plates 55 of the frame 48.

Under normal operating conditions the weight of the conveyor is sufficient to cause it to slide to the farthest downward and forward position in respect to the support frame 62, in which the pins 72 bear against the upper ends of slots 74, as shown in FIG. 3. In case the main conveyor or its associated cutter bar assembly encounters an obstruction during operation of the harvester, the pin and slot connection permits the conveyor frame 48 to slide backwardly and upwardly towards the harvester on frame 62. The slots are of sufficient length to permit the operator of the barge to either stop or reverse the travel of the barge before the pins engage the other ends of the slots.

A trough shaped conveyor frame 76 supporting transverse conveyors 28 is pivotally fixed to the support frame 62 at 78 and to levers 80 at 82. As is apparent from the drawings, this structure causes the transverse conveyors 28 to always maintain substantially the same relative position in respect to the main conveyor regardless of the position to which the latter is moved by hydraulic cylinders 24.

The conveyor bands 54 are of the well known wire mesh type. They are driven by hydraulic motors 84 which are mounted on the upper outside corners of the conveyor frame 48 and which actuate sprocket wheels (not shown) which are in meshing engagement with the bands 54. The lower end of the frame 48 carries idler sprockets (not shown) which are in similar engagement with the bands. Strips 90 carrying barbs 92 are fixed in staggered positions on the bands and serve to prevent material from sliding or rolling down the conveyor as it is moved by the same.

The bands of the two transverse conveyors 28 are of similar wire mesh construction as bands 54 and are driven by a single hydraulic motor which drives gear 94 to directly power one of the conveyors and which is connected by means of chain 96 and idlers 98, 98 to drive the gear 100 of the second conveyor.

The transverse conveyors 28 convey the material to loading conveyor 30 which is fixed to the deck by means of a universal connection 110 and is supported in an upwardly inclined position by a hydraulic cylinder 112. The transverse position of the conveyor 30 is adjustable by means of a hydraulic cylinder 114 (FIG. 2) which controls the position of cylinder 112 on rail 116. Again, the conveyor's band is of similar wire meshed design as those of the earlier described conveyors.

Cutter bar assembly

This assembly, best seen in FIGS. 7–9, is comprised of upper and lower cutter bars 118 and 120 which are of identical design and are actuated for simultaneous relative movement in respect to each other by a hydraulic motor generally indicated at 122. The hydraulic motor has two oppositely positioned pistons 124 and 126 connected by rods 128 and 130 to cutter bars 118 and 120 respectively and mounted for reciprocal sliding movement in cylinder 132. The cutter bars are slidably mounted between retainer plates 134 which are removably fixed to frame 48 by brackets 136. The lower ends of the brackets are bolted to plates 134 and also serve as spacers therebetween. Additional spacer blocks 138 are provided between each bracket. Brackets 136' having an outwardly bent contour are provided on each end of the assembly and are received in sleeves 140 fixed to the sides of frames 48'.

The hydraulic motor 122 has ports 142 and 144 at each of the outer ends of cylinder 132 and a third port 146 at its center. In operation fluid under pressure is simultaneously supplied through ports 142 and 144 and thereby causes pistons 124 and 126 to move towards the center of the cylinder and of course moving the cutter bars in opposite directions. The pistons travel inwardly until they come in contact with block 148 at which time the pressure in the hydraulic circuit containing ports 142 and 144 increases thereby actuating a pressure responsive switch 150 which in turn actuates selector valving, generally indicated at 151 (FIG. 20) to thereby cause fluid under pressure to be supplied to inlet 146 and permitting free outward flow through inlets 142 and 144. The pistons travel outwardly until they reach the position shown in FIG. 8 at which time switch 150 again initiates a reverse flow. From the above it should be appreciated that the piston travel is controlled by a reversing pressure sensitive switch which reverses fluid flow between inlets 142 and 144, and 146 in response to a predetermined pressure build-up on the high pressure side of the hydraulic circuit. Should the cutter blades jam because they have encountered a hard object, the pressure build-up in the cylinder will increase by virtue of the stoppage between the cutter blades and thus will cause the pressure sensitive switch to be actuated and to reverse the travel of the cutter blades. This reversal might disengage the cutter blades from the entanglement; however, should this not be the case, the hydraulic motor will merely reciprocate in a fairly quick sequence without any or only substantially small movement of the cutter blades. Thus, it should be appreciated that the force on the cutter blades will never exceed the predetermined force at which the switch 150 is set to be actuated.

It is further of note that since the forces on the pistons 124 and 126 are always equal and in an opposite direction, no resultant force is exerted on any of the brackets 136 and 136' and thereby any vibrations which might be otherwise transferred to the conveyor frame and the barge as such are eliminated.

Although in most instances the harvester is intended to be operated with the cutter bar assembly attached to the main conveyor the harvester can be operated successfully in removing sediments and loose plant life from the bottom of lakes and streams without the cutter bar assembly. In such cases the barbs 92 also serve to pull the debris and plant life from the bottom of the lakes or streams.

Hooking assembly

The hooking assembly is best illustrated in FIGS. 15–19. The novelty of the hooking assembly lies in that a hook is provided which can be projected upwardly and outwardly to grab a rail of an unloaded or only partially loaded barge and pull it downwardly as well as towards the harvester. Further, the hooking assembly incorporates means which assure a good connection between the two barges even after their relative deck heights change by virtue of the load being transferred from one barge to the other.

The assembly is comprised of a hook 152 having an upwardly extending lever portion 154 and being pivotally connected to a box section member 156 which is slidably mounted in a bracket 158. The box section is reciprocally movable by hydraulic cylinder 160. The lever portion 154 is pivotally connected to a bar 162 which is pressed between two friction members 164, 164 by means of brace 166, which is pressed downwardly by bolts 168 projecting through bar 170 and ears 172 of bracket 158.

When the barge is not being unloaded the cylinder is in a retracted position and the hook slopes downwardly and is received in notch 174. As the hydraulic cylinder is actuated the box section and hook are projected outwardly; however, the frictional force exerted on the bar 162 creates a drag thereon and causes the hook to pivot upwardly and against roller 175. After the cylinder has been fully extended the pressure thereon is reversed and the hook swings downwardly as it is pulled inwardly. During this downward movement the friction members again exert a drag on the bar 162 and cause the hook to pivot downwardly and inwardly. As seen from FIG. 16 this action causes the hook to engage a rail 176 of the transport barge 177 and to pull the same towards the harvester and downwardly to a position in which the deck level of the harvester and of the barge 177 are substantially equal. As the harvester is unloaded its deck level of course rises above that of the barge; however, at such time the hook 152 merely pivots downwardly into the notch 174 yet maintains the barge hooked to the harvester. To release the transport barge cylinder 160 is again extended and the harvester is driven away from the transport barge at which time the cylinder can again be retracted to position the hook in notch 174.

*Unloading mechanism*

The construction of the bin 26 and of the unloading mechanism is best illustrated in FIGS. 10–14.

The bin is constructed of channels 184 and 186 (FIG. 14) which forms the sidewalls and is normally closed at one end by the ejection plate 188 and at the other by tail gate 190. The floor of the bin is formed by channels 191 and is fixed to pedestal 193 to space it from the deck of the harvester. The ejector plate is provided on each side with short channel slides 192 which are in slidable engagement with corresponding channels 184 of the bin's framework. A pair of pivotally mounted hydraulic cylinders 194 are provided for moving the plate between the retracted and extended positions as shown in FIGS. 10 and 11 respectively.

The tail gate is fixed to reinforcing members 195 by levers 196 and links 198 which are pivotally connected to the reinforcing member and the gate by pins 200. The levers have crank arm portions 210 which are pivotally connected to rods 212. Rods 212 extend along the sides of the bin and are in turn pivotally connected to rods 214 which are mounted for slidable movement in appropriate apertures 216 in channels 186 of the bin structure. The latter rods are provided with inwardly extending pins 217 which are positioned against the forward side of upstanding frame members 218 of the ejection plate frame.

As cylinders 194 are extended the ejection plate as well as frame members 218 are moved towards the rear. At such time the force of tension spring 220 and the weight of the tail gate is sufficient to cause the tail gate to pivot away from its closing position. By the time that the ejection plate has passed channel 186′ the tail gate has pivoted to its fully downward and inward position. Any further outward movement of the ejection plate will cause the material contained in the bin to be ejected therefrom. As seen in FIG. 12 at this time the movement of the tail gate will be stopped. As the ejection plate is retracted the gate remains in its downward position until the frame members 218 intercept pins 217 whereafter the cylinders will cause the tail gate to be moved to the closing position by virtue of the interengagement between the pins and the frame member.

It is of note that when the tail gate is pivoted to the position shown in FIG. 11 it has a small portion extending over the edge of the barge, this assures that all of the material ejected from the bin will be deposited in the transport barge. The ejection mechanism and the hooking assembly permit accurate placement of the barge in respect to the harvester and accurate placement of the ejected material in the transport barge. When comparing this method of unloading with the methods practiced heretofore which basically consisted entirely of tipping the entire bin, it should be apparent that this invention permits decidedly most efficient loading of the transport barge.

*Main conveyor retracting structure*

Figure 21:
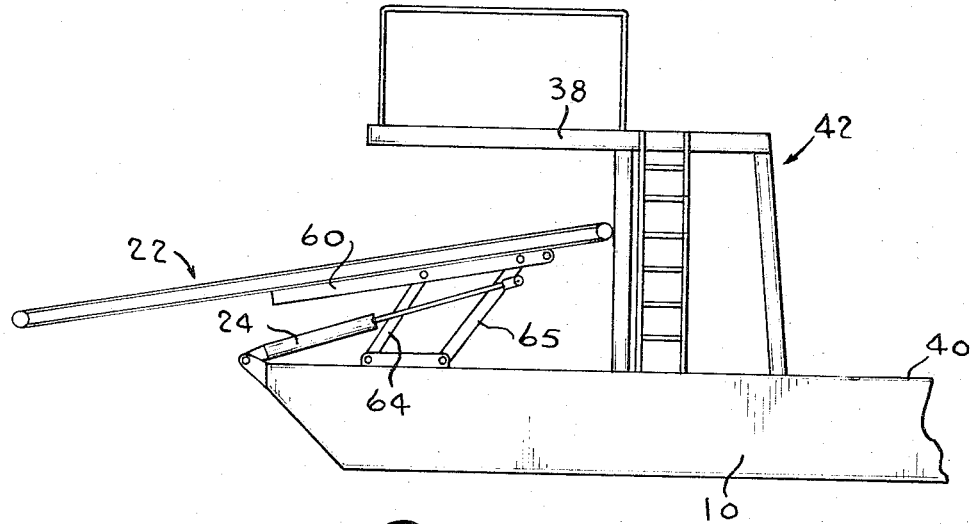
FIG. 21 is a side view of the harvester showing the main conveyor in a retracted position.

FIG. 21 shows the main conveyor 22 in a position in which the cylinder 24 has been fully extended to thereby rotate arms 64 and 65 past the vertical to a rearwardly extending position and place the center of gravity of the main conveyor over the deck of the barge 10. In this position the barge is adapted to be transported over land. The transverse conveyor 28 has been removed and stored in a suitable place in order to provide clearance for the full retraction of main conveyor 22. Because arms 64 and 65 have been moved from the forwardly extending position as shown in FIG. 1 to the rearwardly extending position, the weight of the conveyor exerts a clockwise moment on arms 64 and 65 and thereby aids in maintaining the main conveyor in the retracted position.

It should be noted that when the arms 64 and 65 are in the forwardly extending position as shown in FIG. 1, the weight of the main conveyor exerts a counterclockwise moment on arms 64 and 65 and that the center of gravity of the conveyor is normally in a position beyond the front end of the barge. In this position the conveyor may be considered as an "overhanging load" which is supported by cylinder 24. As the arms are moved past the vertical during retraction of the main conveyor, the conveyor assumes a position closer to the horizontal than before, its center of gravity moves closer to the deck level, and the weight of the conveyor aids the cylinder 24 in causing further retraction motion. These three factors provide stability to the barge as well as to the main conveyor.

*Reversing mechanism*

Figure 22:
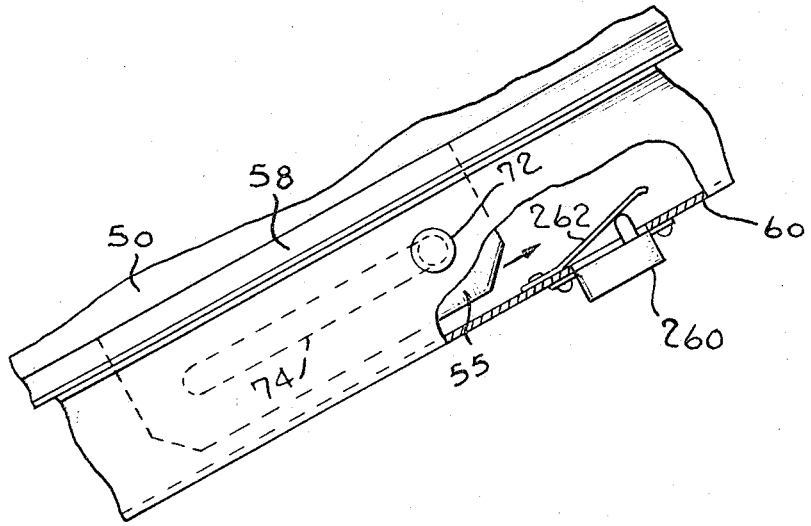
FIG. 22 is a fragmentary side view of the main conveyor frame and its support frame.

The reversing mechanism is a feature of the harvester which will permit a stoppage or reversal of the paddle wheels 12 in the event that the main conveyor encounters an obstruction which causes the conveyor to travel upwardly and backwardly on its supporting frame. As illustrated in FIG. 22, a switch 260 may be mounted on one of the channel members 60 and be connected by a suitable circuitry (not shown) for causing either stoppage or reversal of the travel of paddle wheels 12. As the main conveyor travels upwardly in channels 60, plate 55 of the conveyor frame will depress member 262 of the switch thereby causing the mentioned stoppage or reversal. The actuation should occur at a point before pin 72 has engaged the lower end of slot 74, since a limited forward travel of the barge can be expected before it comes to a stop independent of the obstruction encountered by the conveyor. The particular location of switch 260 is thought to be within the realm of an expert, however, it is desirable that it be such that the barge travel may be automatically stopped or reversed by the time pin 72 has traveled the entire length of slot 74.

It will be appreciated that the provision of the switch 260 is not essential to the main features of this invention, however, that it may be employed to provide automatic response to the obstruction in the path of the harvester.

*Hydraulic circuit*

The hydraulic circuit is schematically illustrated in FIG. 20. The various hydraulic components have been labeled in the drawing and therefore it is thought that a great part of the circuit is self-explanatory in view of the description made so far in the specification. The return lines are merely indicated by the letters RL and for the sake of clarity are not shown to extend to the reservoir of the circuit.

For the sake of clarity, the part of the hydraulic circuit controlling the cutter bar assembly will be described in reference to FIG. 20. The hydraulic pressure is supplied to motor 91 by opening cutter control valve 230. The pressure is supplied to selector valve 232, which with the pistons 124 and 126 (FIG. 8) being in the outward position, is operable to pass the high pressure fluid from line 234 to line 236 leading to the ports 144 and 142. At the same time line 238 leading to the pressure switch 150 is subjected to the same pressure. In this position the selector valve connects line 242 to the return line 244. In response to the high pressure fluid supplied to ports 142 and 144 both pistons move inwardly until they either engage block 148 (FIG. 8) or the cutter blades are obstructed, at which time the back pressure in line 236 and therefore line 238 builds-up and thereby causes pressure switch 150 to be actuated to move the selector valve 232 to a position connecting line 236 to return line 248 and connecting line 242 to the high pressure line 234. This actuation of the selector valve will of course be effective to move the pistons outwardly until they either reach the outer ends of the cylinder or until the cutter blades meet an obstruction, at which time the back pressure in line 242 will be relayed to the pressure switch by means of line 250 to thereby actuate pressure switch 150 and cause the selector valve to move back to the first described position.

Since selector valves of the type described are well known in the art, it is believed that the particular selection of one is within the realm of one skilled in this art. The pressure sensitive switch 150 can be either of electric solenoid type or the hydraulic type. Also the selection of this switch is thought to be in the realm of the expert.

Although but a single embodiment of the present invention has been illustrated and described, it will be apparent to those skilled in the art that various changes and modifications may be made therein without departing from the spirit of the invention or from the scope of the appended claims.

I claim:

1. An aquatic harvester comprising, a powered barge having a conveyor comprised of a conveyor frame and of powered conveyor means adapted to convey material over and to one end of said frame, a support structure mounted on said barge, said conveyor frame being fixed for limited relative motion to said support structure and being supported thereby in a position so as to place part of the conveyor under the surface of water during use of the barge, said conveyor frame and support structure cooperating to normally position said conveyor in a downwardly extended position and to cause limited motion of said conveyor towards said barge upon encountering an obstruction in the path of the conveyor, said support structure including two arms pivotally connected to said barge and extending forwardly to position the center of gravity of said conveyor means beyond said barge and being movable to a rearwardly extending position to move the conveyor means to a retracted position and position the center of gravity of the conveyor means over the barge.

2. An aquatic harvester according to claim 1 in which: there are reciprocally movable cutter bars mounted on the forward end of said conveyor frame;
a pressure operated motor for each bar imparts reciprocal movement thereto; and
pressure responsive control means operates to reverse the motion of said cutter bars when the movement of said cutter bars is stopped by an encountered obstruction.

3. An aquatic harvester according to claim 2 wherein said cutter bars comprise two toothed bars and wherein said motor means comprise a cylinder having two pistons slidably mounted therein and each piston being connected to one of said bars, and means for simultaneously supplying pressure to one side of each piston to thereby cause them to travel in a direction opposite to each other and operable to simultaneously relieve said pressure and to apply pressure on the other sides of said pistons to thereby cause them to travel in the opposie direction.

4. An aquatic harvester according to claim 1 including hook means and hook actuating means operable to cause said hook means to move outwardly and upwardly in respect to the harvester to thereby be adapted to engage a transport barge and operable to cause said hook means to move inwardly and downwardly to thereby pull said transport barge towards the harvester.

5. An aquatic harvester according to claim 4 wherein said hook means is pivotally connected to said actuating means and is operable to pivot as the deck level of transport barge changes yet is operable to remain hooked to the barge.

6. An aquatic harvester according to claim 5 wherein said hook means includes a crank arm portion and wherein said crank arm portion is connected to brake means which provide a drag to the outward and inward movements of said hook means and thereby cause said upward and downward component of said movements.

7. An aquatic harvester comprising:
a powered barge having a forward end, a forward deck, a rear deck, and a rear end;
a longitudinally extending main support frame mounted on said forward deck consisting of longitudinally extending transversely spaced channel members and support arms pivoted to said forward deck and to said channel members at places spaced fore and aft thereof, said support arms causing said main support frame to move upwardly and swing from a cutting position extending downwardly and forwardly over said forward end to a retracted position over said barge and above said forward end;
a hydraulic ram reacting between said barge and said main support frame to move said main support frame from said cutting position to said retracted position;
a conveyor support frame having longitudinally extending members forming a forward end adapted to be positioned under the surface of the water in the use of said barge and a rearward end positioned over said forward deck, the upper surface of said members providing a support for the upper run of a conveyor, flanged members secured to the lower side of said longitudinally extending members having upper surfaces providing a support for the lower run of a conveyor, said flanged members being slidably supported on the channel members of said main support frame to provide straight line relative motion between said conveyor support and said main support frame;
an endless wire mesh longitudinal conveyor supported on the upper surface of the longitudinally extending members of said conveyor support frame and said flanged members and extending around said forward and rearward ends thereof; and
means for limiting the relative straight line motion between said conveyor support frame and said main support frame whereby said conveyor and said conveyor support frame will move upwardly and rearwardly relative to said main support frame upon said forward end encountering an obstruction.

8. An aquatic harvester according to claim 7 in which:
a laterally extending trough-shaped conveyor frame has one side pivotally mounted to the upper end of said main support frame;
support arms are pivoted to said forward deck and to the other side of said trough-shaped conveyor frame so that said frame is maintained in position below the rearward end of said conveyor support frame during motion of said main support frame from cutting position toward retracted position; and transverse conveyors are supported in said trough-shaped conveyor frame with their inner ends spaced to conveyor material from said longitudinal conveyor to a central discharge area.

9. An aquatic harvester according to claim 8 in which: a loading conveyor has a forward end positioned below the discharge area of said longitudinal conveyor and said transverse conveyors and a rearward discharge end in elevated position above said rear deck of said barge.

10. An aquatic harvester according to claim 9 in which: a universal connection mounts said forward end to said rear deck;

a first hydraulic ram extends between said discharge end and said rear deck of said barge to adjust said elevator position; and a second hydraulic ram adjusts the transverse position of said first hydraulic ram to vary the transverse position of said discharge end.

11. An aquatic harvester according to claim 9 in which: a bin with a forward end and discharge end is rigidly mounted on said rear deck below the rearward discharge end of said loading conveyor;

there is a tail gate for said bin which in open position lies below said bin with a portion extending beyond said discharge end of said bin and said rear end of said barge;

there are bell crank levers and straight links pivotally connected to said bin and said gate at spaced places to cause said gate to drop and swing from a closed position against the discharge end of said bin to a suspended position below said bin, the weight of said tail gate assisting in the dropping and swinging of said gate relative to said bin;

there is an ejection plate slidably mounted in said bin for movement from said forward end to said discharge end;

there are hydraulic means for moving said ejection plate back and forth between said ends; and there is lost motion connection means between said ejection plate and said bell crank levers to hold said tail gate in closed position when said ejection plate is at said forward end and to allow said tail gate to drop and swing to open position upon a partial movement of said ejection plate toward said discharge end, further movement of said ejection plate toward said discharge end being free of connection with said lost motion connection means.

12. A cutter bar assembly comprising two toothed bars positioned in overlying relationship in respect to each other, a piston fixed to each bar, said pistons being mounted in an aligned relationship in a cylinder, and means for simultaneously applying fluid pressure on one side of each piston to cause said pistons and bars to travel in one direction opposite to each other, and means for simultaneously relieving said pressure and for applying fluid pressure on the other side of each piston to thereby cause said pistons and said bars to travel in the opposite direction.

13. A cutter bar assembly comprising two toothed bars positioned in overlying relationship in respect to each other, a piston fixed to each bar, said pistons being mounted in an end to end position in a cylinder, hydraulic means to reciprocally move said pistons towards and away from each other, and switch means responsive to a predetermined force opposing the movement of said pistons to cause reversal of the travel of both pistons.

14. A cutter bar assembly according to claim 13 wherein said cylinder has stop means and ports at its axial center and at its ends, and wherein said hydraulic means reciprically supply fluid under pressure through said ports at the ends of said cylinder and through said central port.

15. A cutter bar assembly according to claim 14 wherein said switch means are actuated by the pressure build up on the sides of said pistons to which fluid under pressure is being supplied by said hydraulic means.

References Cited

UNITED STATES PATENTS

| | | | |
|---|---|---|---|
| 1,344,626 | 6/1920 | Ellis | 56—9 |
| 1,481,177 | 1/1924 | Bayard et al. | 56—9 |
| 1,762,568 | 6/1930 | Barber | 37—90 |
| 2,223,641 | 12/1940 | Sanger | 56—8 |
| 2,694,891 | 11/1954 | Brown | 56—23 X |
| 3,170,578 | 2/1965 | Moreland | 214—82 |
| 3,192,972 | 6/1965 | Tenney | 56—26.5 |
| 3,286,447 | 11/1966 | Grinwald | 56—9 |

OTHER REFERENCES

Shepard: Salt Water Farmers, Popular Mechanics, July 1952, pp. 141–143.

ABRAHAM G. STONE, *Primary Examiner.*

P. A. RAZZANO, *Assistant Examiner.*